Oct. 17, 1933.   C. E. WILLIAMS   1,931,400
ADJUSTABLE CONNECTER
Filed May 31, 1930   3 Sheets-Sheet 1
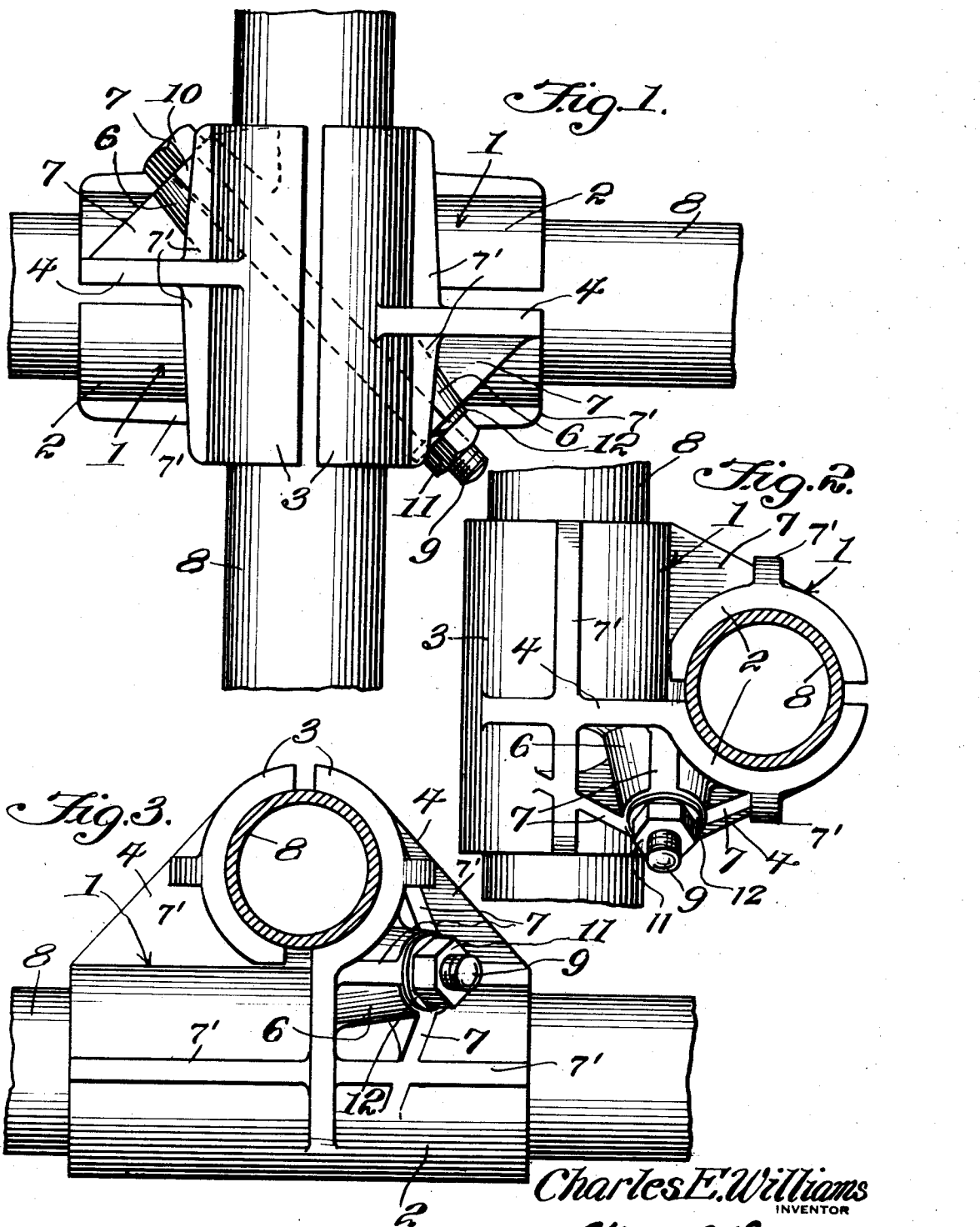
Charles E. Williams
INVENTOR
BY Victor J. Evans
ATTORNEY Oct. 17, 1933.                C. E. WILLIAMS                1,931,400
                           ADJUSTABLE CONNECTER
                           Filed May 31, 1930            3 Sheets-Sheet 2
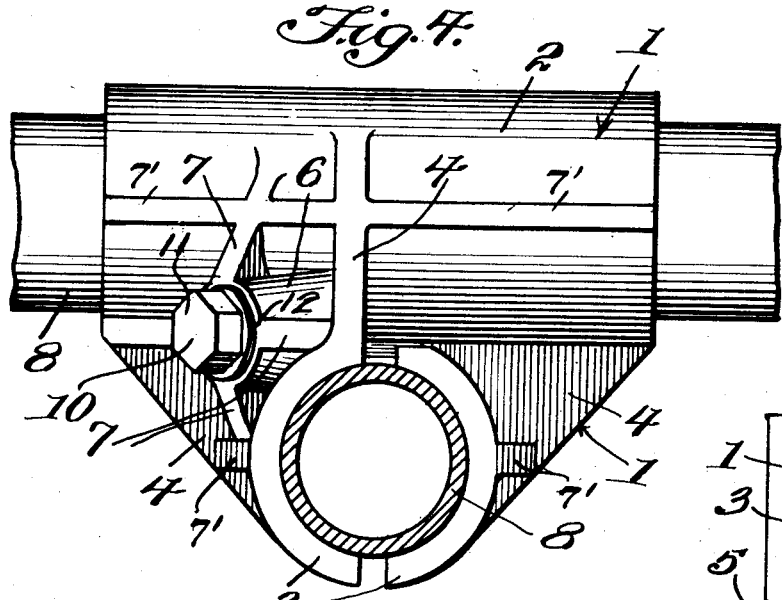
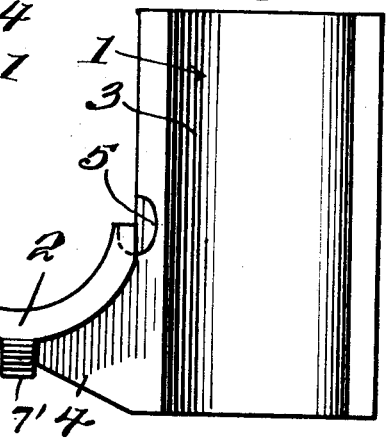
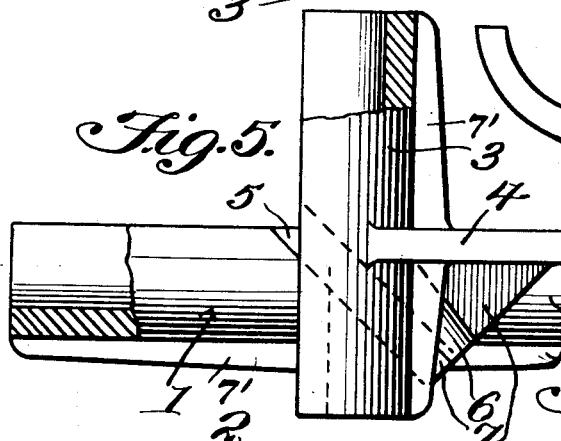
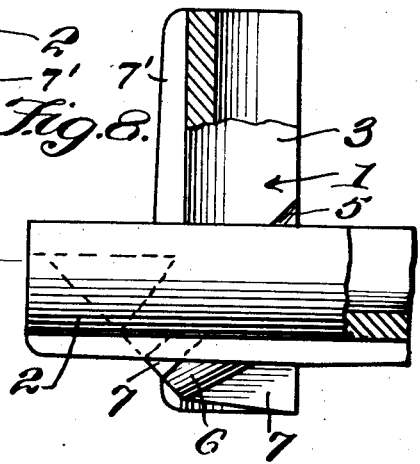
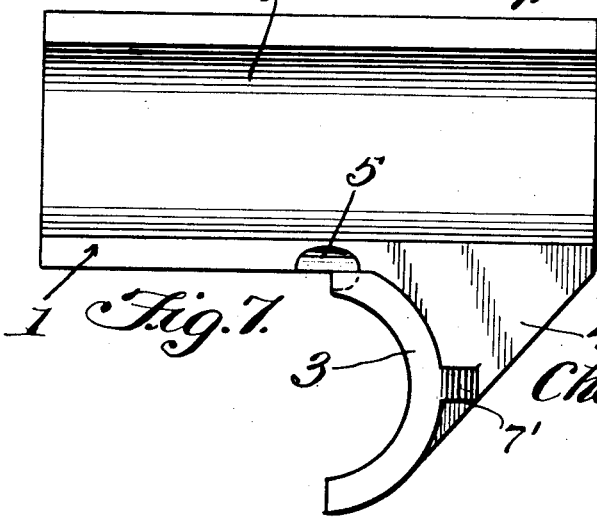
Charles E. Williams
INVENTOR
BY Victor J. Evans
ATTORNEY Oct. 17, 1933.      C. E. WILLIAMS      1,931,400
ADJUSTABLE CONNECTER
Filed May 31, 1930         3 Sheets-Sheet 3
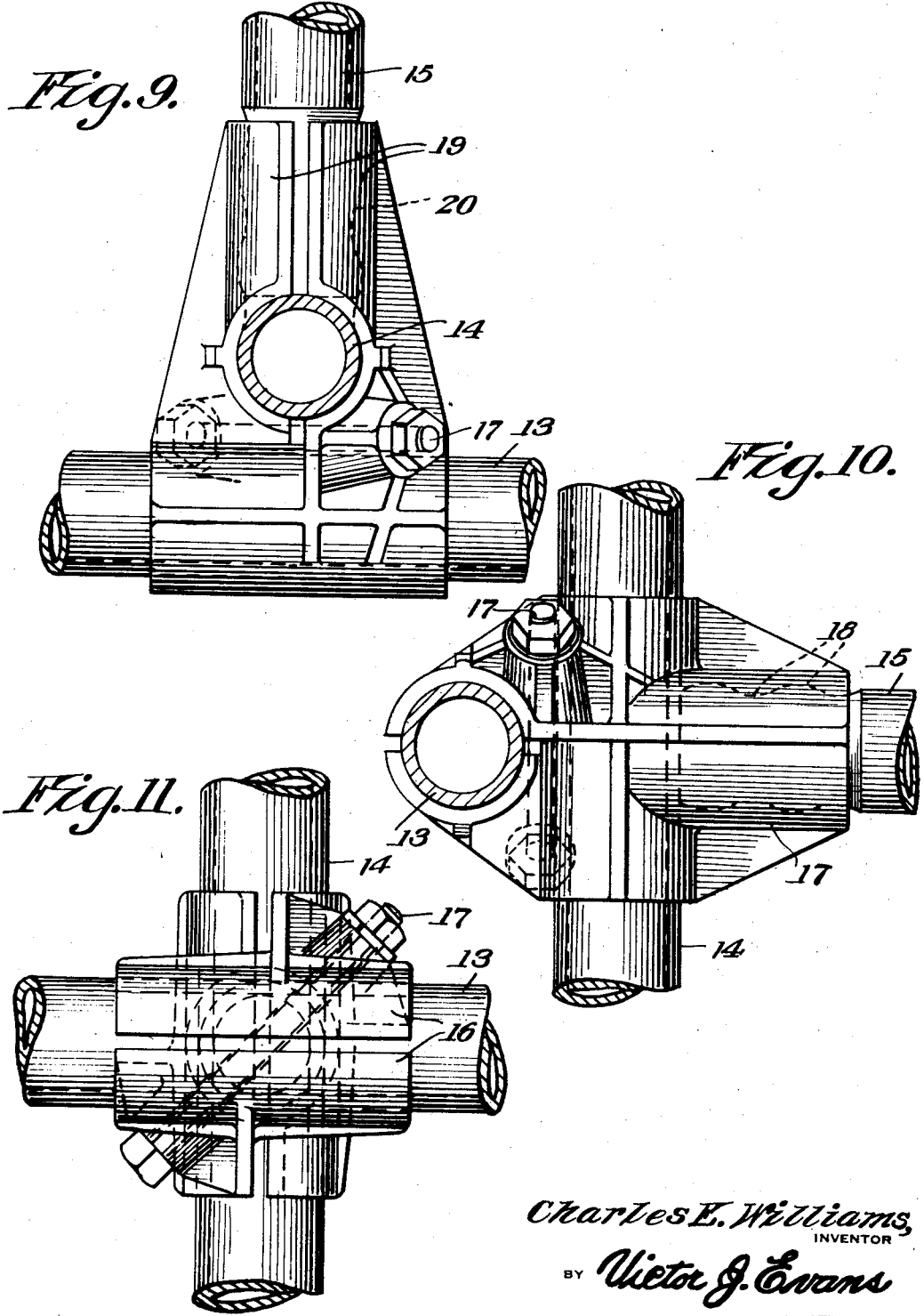

Patented Oct. 17, 1933

1,931,400

UNITED STATES PATENT OFFICE 1,931,400

ADJUSTABLE CONNECTER

Charles E. Williams, Edgewood Borough, Pa., assignor of forty-four per cent to Albert W. Bendig and five per cent to Rudolph W. Williams, Pittsburgh, Pa.

Application May 31, 1930. Serial No. 458,174

1 Claim. (Cl. 287—54)

This invention relates to a device for connecting intersecting structural parts such for example as pipes, rods, cables, and the like and, in view of the difficulties which have heretofore attended the connection of intersecting structural parts such for example as those employed in building structures, elevator towers, forestry service lookout towers, radio antennæ towers, airway beacon lighting and signal structures, oilwell derricks, portable and permanent framework, portable or permanent display stands, garages, lean-to's, outdoor advertising structures, metal furniture, playground devices, fencing, poles for high tension electric lines, conduits, and many other structures, due to the fact that connections which have heretofore been employed have required bolting, riveting, or welding, and the boring of holes or the threading of the members to be connected, and other alterations of the structure of such members, the present invention has as its primary object to provide a connecter which will overcome all of the disadvantages and which may be adapted to solid or tubular intersecting structure parts to connect the same at any desired angle or intersection and without any alteration whatsoever in the construction of such parts.

Another object of the invention is to provide a device for connecting such structural parts as those referred to and which device will require but a single fastening and bolt for its application to and clamping engagement with the parts to be connected.

Another object of the invention is to provide a connecter for the purposes stated in which the clamping means will consist of but two sections which are of counterpart construction and which may therefore be manufactured at a lower cost than where such sections are formed of non-corresponding structure.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing my invention in detail, reference will be had to the accompanying drawings, wherein like characters denote like or corresponding parts throughout the several views, and in which:

Figure 1 is a view in elevation of a connecting device constructed in accordance with the present invention and illustrating the device employed for the purpose of connecting two intersecting pipes.

Figure 2 is a view looking at one side of the device and showing one of the connected pipes in cross section.

Figure 3 is a plan view of the device illustrating one of the pipes in horizontal section.

Figure 4 is a view similar to Figure 3 illustrating the connecter arranged in a manner to connect two intersecting pipes arranged in a different manner from the arrangement shown in Figure 3.

Figure 5 is a view in elevation illustrating one member of the connecter.

Figure 6 is an end elevation of said member.

Figure 7 is a top plan view thereof.

Figure 8 is a view in elevation illustrating a companion member for the member shown in Figure 5.

Figure 9 is a view partly in plan and partly in section illustrating a modified form of connecter.

Figure 10 is a view in side elevation of the modification shown in Figure 9.

Figure 11 is a view in side elevation looking at the left side of Figure 10.

As before stated, the connecter embodying the invention consists essentially of two or more substantially counterpart, mating sections and each of these sections, which are indicated in general by the numeral 1, comprises a substantially semi-cylindrical member 2 and another semi-cylindrical member 3 which is cast or otherwise formed integral with the member 2 and connected therewith and reinforced with respect thereto by a web 4, this web being flush with one of the members at the open side thereof and integral with the outer side of the other member at a point intermediate its ends.

While the members are interiorly semi-cylindrical, as they are, in the illustrated embodiment, designed to fit and connect cylindrical pipes or rods, it will be understood that their interior contour may be otherwise formed where the members are to fit and connect other than cylindrical parts.

While the members 2 and 3 are illustrated in the drawings as extending at right angles to each other, it will be evident that they may be made to extend at other angles, depending upon the intersecting relationship of the pipes or other members to be connected. Each member is formed with an opening 5 which is diagonal to the members 2 and 3 at the points of juncture of the said members, and at the juncture of the members and integral with their outer sides, they are formed each with a boss 6 which is of substantially conical form and which boss is formed at its outer side with webs 7 which may be radially or otherwise disposed, and which serve to reinforce it with respect to the members. The members are also formed with other webs 7 which extend longitudinally thereof. Figures 1, 2, 3 and 4 illustrate various ways in which the two counterpart members of the connecter may be relatively arranged and assembled and, it will be observed, by reference to these figures, that the members 2 of the two sections will oppose each other as also the members 3, in any assembled relation of the two sections so that the pipes or the like, indicated by the numeral 8, will be embraced by the concave embracing sides of the said members.

In order to connect the members or sections of the device and thus maintain the pipes or other parts in their proper relative angular arrangement at their point of intersection, a bolt 9 is fitted through the openings formed in the bosses 6 and this bolt is provided at one end with a head 10 and has threaded upon its other end a nut 11 which is adjustable to bind against a lock washer 12 likewise fitted onto this end of the bolt.

From the foregoing description of this embodiment of the invention it will be evident that the compound counterpart members of the connecter are reinforced in such a manner that, while they are connected only by a single bolt, the connection between the members will be an exceptionally rigid one particularly in view of the provision of the bosses 6 and the reinforcing webs 4 and 7', and therefore, two pipes, rods, cables or other structural parts, connected in intersecting relation by the use of the device, will be securely held against any displacement whatsoever. It will further be evident, from the foregoing description, that it will be unnecessary to bore any holes in the pipes or the like to be connected and unnecessary to thread these pipes in order to effect their proper connection at their point of intersection. It will furthermore be evident that the connecter embodying the invention is adapted to be applied to intersecting pipes, cables, or other parts, regardless of the distance between their point of intersection and their ends. It will further be evident that it is immaterial at what angle the parts to be connected may be disposed as regards either part and likewise immaterial whether either or both of the parts are to span major strains which may be imposed thereon, in view of the fact, that because of the peculiar construction of the connecter, the parts are evenly braced and reinforced.

In the modified form of the invention shown in Figures 9, 10 and 11 of the drawings, the connecter is illustrated as being adapted to connect a straight length of pipe, indicated by the numeral 13, and another length, indicated by the numeral 14, and extending at right angles and in intersecting relation with respect to the pipe 13, as well as another pipe 15 which terminates at one side of the pipe 14 and extends at right angles with respect thereto, it being understood of course that pipes are illustrated merely to disclose the idea of the invention and that in this embodiment, as in the previously described embodiment, any relatively adjacent and relatively angularly disposed parts may be connected by the use of the connecter. As shown in the said Figures 9, 10 and 11, the connecter comprises two counterpart sections which are indicated by the numeral 16 and which correspond to the sections 1 of the first described embodiment, and these have their opposing or mating faces formed to embrace the sides of two intersecting parts to be connected. The sections are separably connected by means of a bolt 17 corresponding to the bolt 9 of the previously described embodiment. In this modified embodiment of the invention it is intended that the same shall be adapted, as above stated, to also connect, to the intersecting pipes or other parts, a pipe or part extending at right angles with respect to one of the first mentioned connected parts and, assuming that the last mentioned part is in the nature of a pipe, the same is corrugated, exteriorly, at its end which is to be connected, as indicated by the numeral 18, and the sections 16 are formed at right angles to their portions corresponding to the portions 3 of the previously described embodiment with extensions 19, which extensions are flanged at their opposing sides and formed with reinforcing ribs as in the previously described embodiment, and the opposing faces of the parts 19 are formed with corrugations 20 which correspond to and fit the corrugations 18 at the end of the pipe 15.

What I claim is:

A connecter for angularly related crossing members comprising complemental elements of which each consists of cross-sectionally semicircular members arranged with their axes in angularly related planes, and a web flush with one of the members at the open side thereof and integral with the other member at the outer side thereof and at an intermediate point in its length, said members being formed with longitudinal webs arranged in crossing relation to the first said webs, and a bolt arranged diagonally of either of the members of either element and passing through said elements between the members thereof.

CHARLES E. WILLIAMS.